Oct. 3, 1933.  C. KARA  1,929,070
SIGNALING DEVICE FOR VEHICLES
Filed April 14, 1932  4 Sheets-Sheet 1
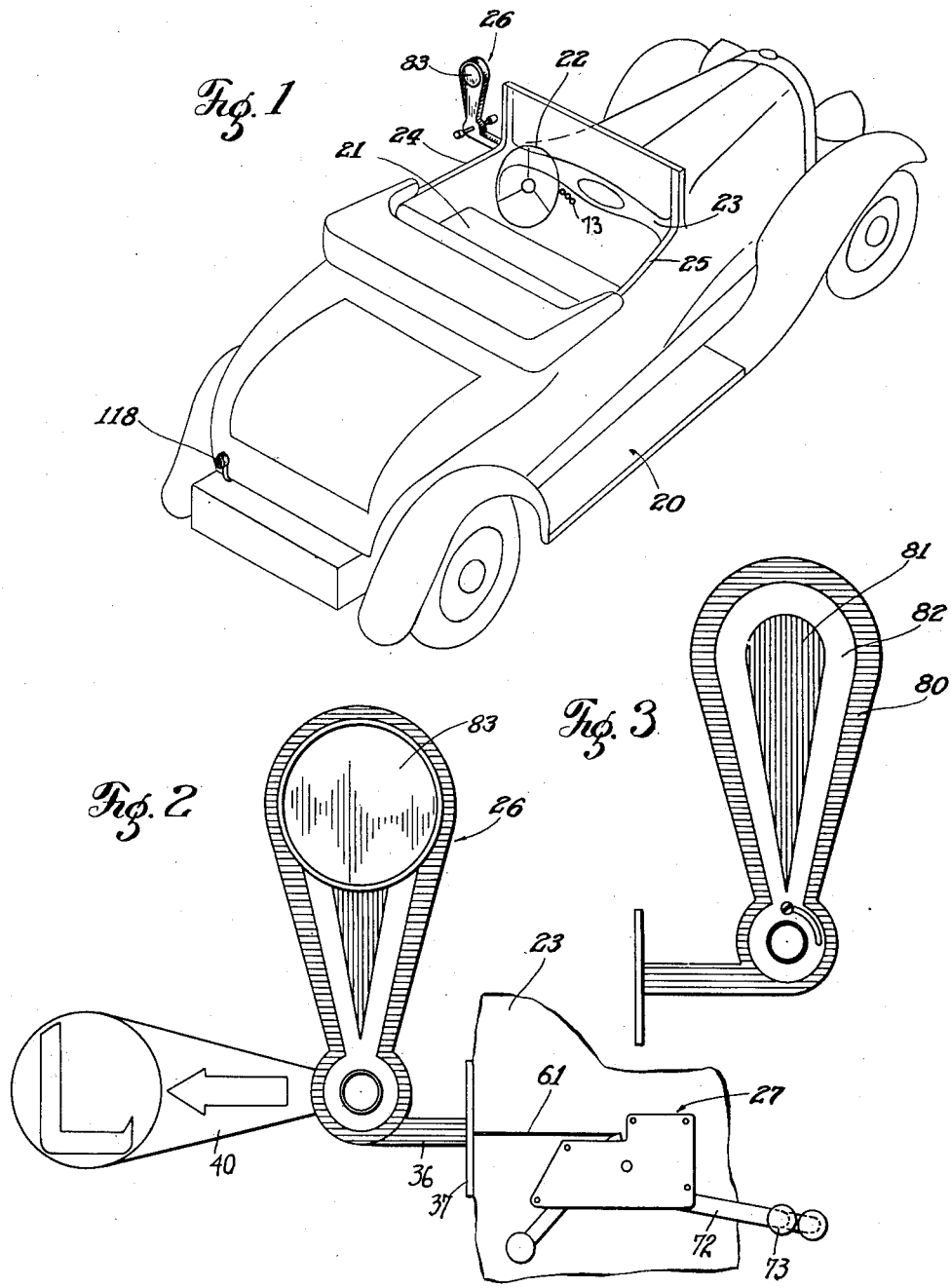
CHARLES KARA,
INVENTOR.
BY Julian J. Wittal,
ATTORNEY Oct. 3, 1933.       C. KARA       1,929,070
SIGNALING DEVICE FOR VEHICLES
Filed April 14, 1932       4 Sheets-Sheet 2
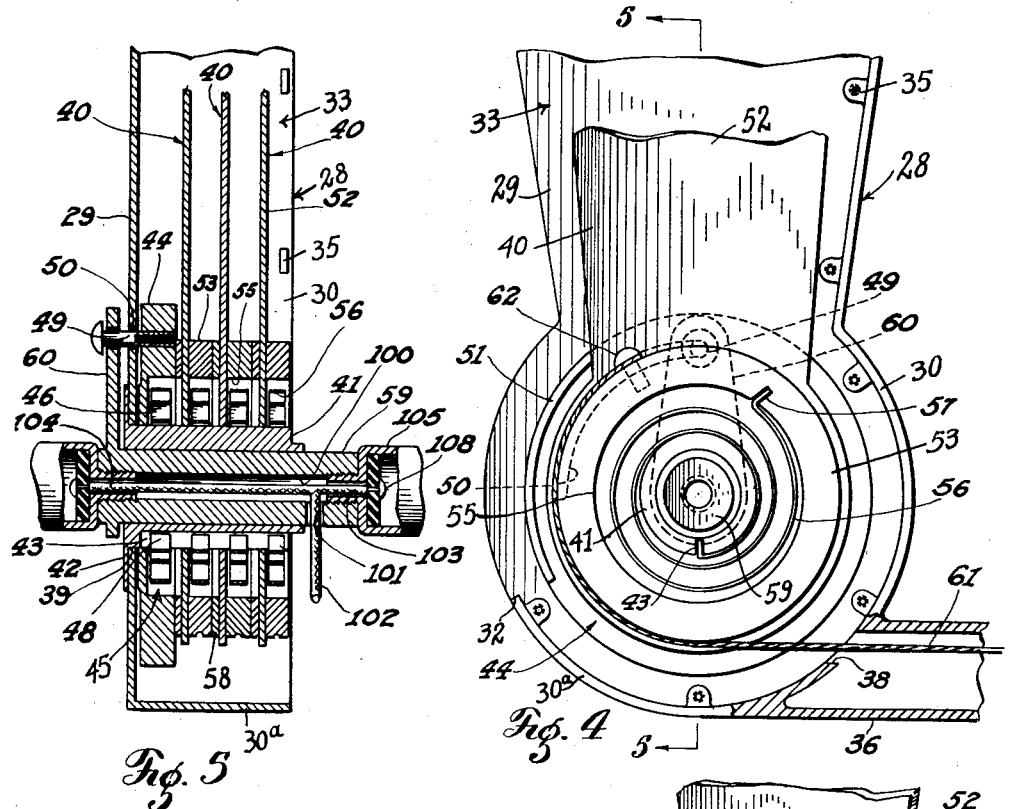
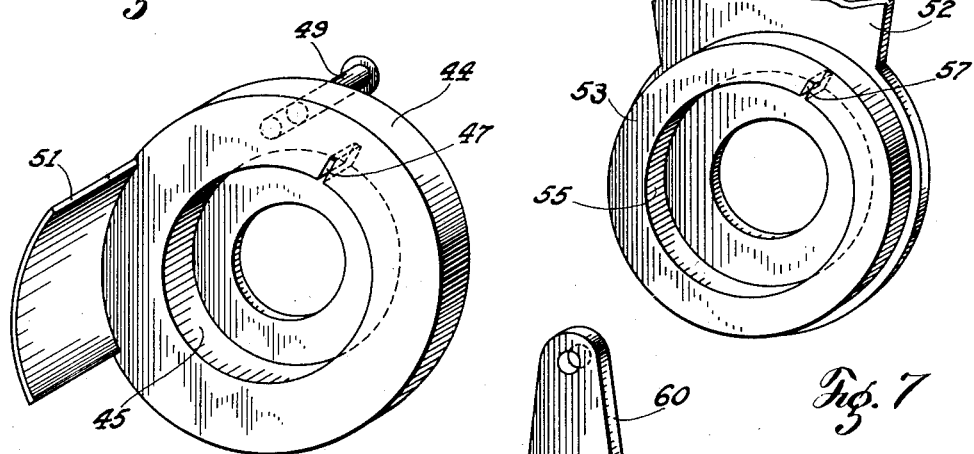
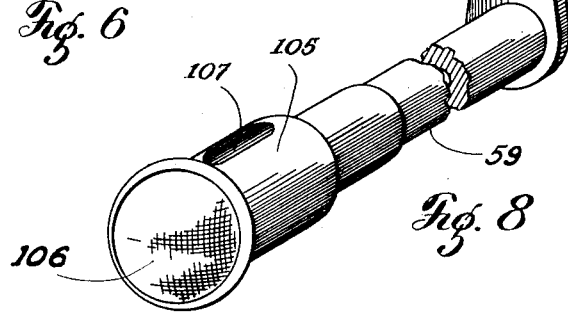
CHARLES KARA,
INVENTOR.
BY Julian J. Wittal
ATTORNEY

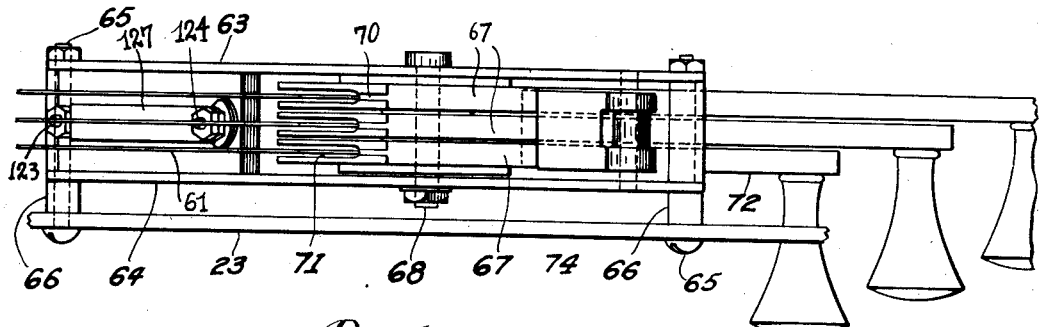
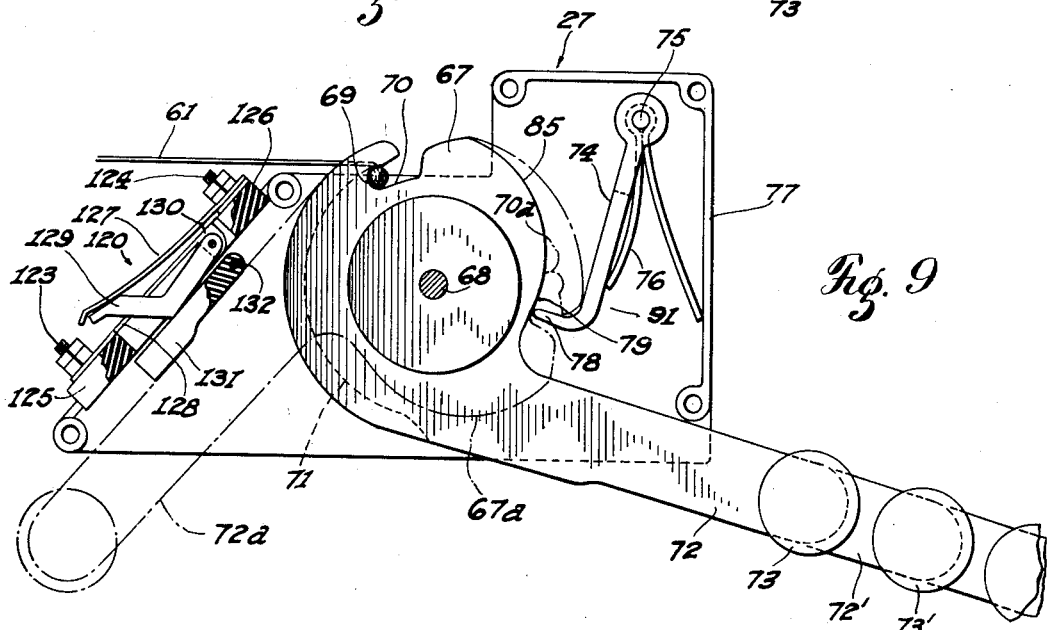
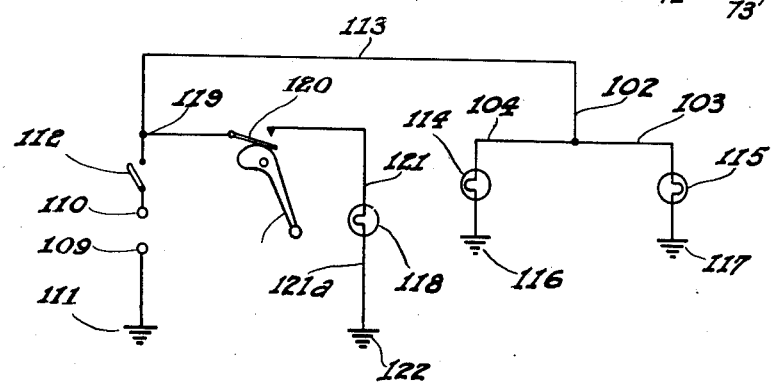

Oct. 3, 1933.                C. KARA                1,929,070
                    SIGNALING DEVICE FOR VEHICLES
              Filed April 14, 1932        4 Sheets-Sheet 4
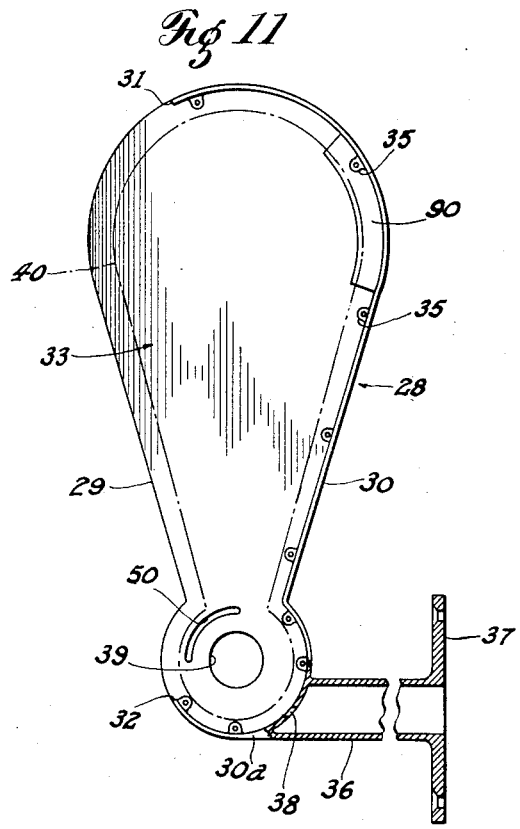
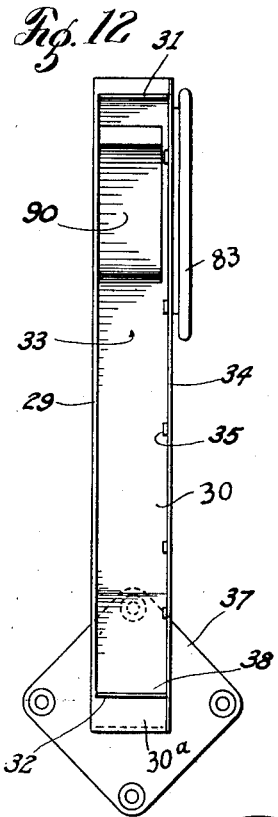
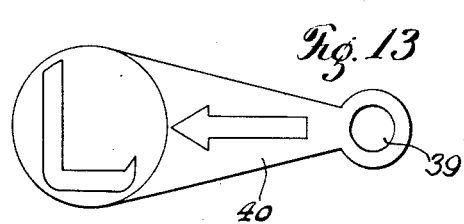
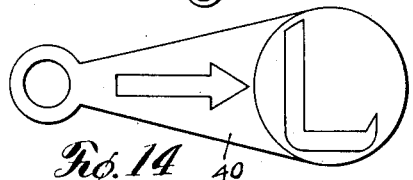
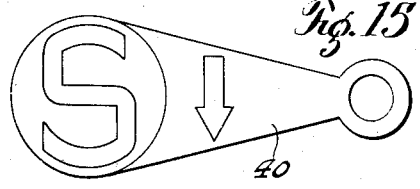
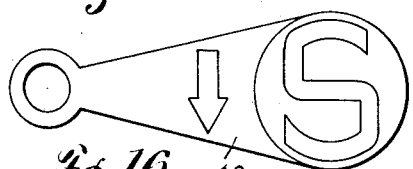
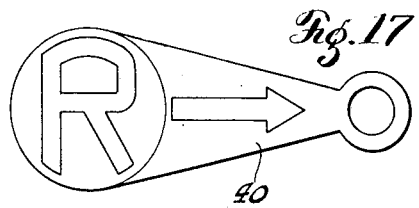
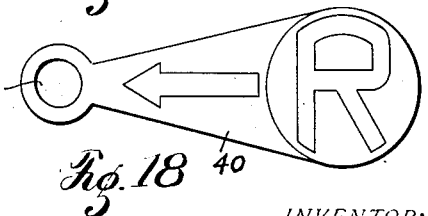
INVENTOR:
CHARLES KARA,
BY Julian J. Wittal
ATTORNEY Patented Oct. 3, 1933

1,929,070

UNITED STATES PATENT OFFICE 1,929,070

SIGNALING DEVICE FOR VEHICLES

Charles Kara, Elizabeth, N. J.

Application April 14, 1932. Serial No. 605,143

4 Claims. (Cl. 116—53)

This invention relates to signaling devices for vehicles, particularly for automobiles and it is in the class of mechanically operated signaling devices for such vehicles, having for its main object to provide such a device in which the most frequently used signals, like the ones indicating left hand or right hand turns, and stops, respectively, are combined in one unit, placed in an appropriate and efficient manner on the vehicle and easily operated from the seat of the driver.

Another object of this invention is to provide such a combined signaling device in which only one signal may be operated at one time, and the attempted operation of another signal will automatically return the previous one to its normal position, while each signal will be fixed in its signaling conspicuous position when so desired and will need no further attention.

Still another object of this invention is to make the signals proper, conspicuous and attractive, as well as their casing when one is used, so as to call the attention of the drivers of cars coming toward and following the vehicle in question to my signaling device.

Still further objects of this invention will be apparent as the specification of the same proceeds and among them may be mentioned; to provide a device as characterized hereinbefore, which will have electric signaling and illuminating lights connected therewith and automatically operated with the mechanical signals, which will be adapted to be conveniently applied to the present automobiles, which will be comparatively simple and adapted to mass manufacturing.

In the drawings forming a part of this specification and accompanying the same:

Fig. 1 is a perspective view of an automobile equipped with my signaling device.

Fig. 2 is a fragmentary semi-diagrammatical plan of my device as applied on the dash board of an automobile, one of its signals being shown as in use.

Fig. 3 is a front elevation of the casing for the signaling arms of my device when said arms are at rest.

Fig. 4 is an enlarged fragmentary elevation of the lower portion of my signaling arms in their casing, the cover of the casing having been removed.

Fig. 5 is a sectional elevation of the same portion of my device as shown in Fig. 4, the section being taken on the line 5—5 of Fig. 4.

Fig. 6 is a perspective view of a spring operated hub disk with a segmental sleeve extension used in the portion of my device, shown in Figs. 4 and 5 to cooperate with the signaling arms.

Fig. 7 is a fragmentary perspective view of the hub portion of one of the signaling arms used in my device.

Fig. 8 is a perspective view of a rotating hollow shaft passed through said signaling arms housing and operating the electric lights for said signals.

Fig. 9 is a side elevation of the signal arms operating mechanism of my device, with its cover removed, while Fig. 10 is a top plan view thereof.

Fig. 11 is a partly sectional side elevation of the housing for the signaling arms, the cover of the same as well as the contents thereof having been removed, while Fig. 12 is a front elevation thereof, executed in a similar manner to Fig. 11 but the cover thereof being shown as replaced.

Figs. 13, 14, 15, 16, 17, and 18 are front and rear views, respectively, of the three signal arms used in my device, being shown in horizontal positions as they would appear when in signaling positions.

Fig. 19 is an electrical diagram.

Referring now more closely to the drawings by characters of reference, the numeral 20 indicates a vehicle, in this case an automobile, in general, having the driver's seat, as at 21, steering wheel 22, the usual dashboard and instrument board 23, and left and right hand confining side walls 24 and 25 for the driver's compartment, as is well known in the art. My signaling device is shown by heavier lines to the left and in front of the driver's seat preferably secured on the outer side of the side wall 24 and shown without any signaling arms being used, as indicated in general by the numeral 26.

My signaling device has two main portions, best shown in a semi-diagrammatic way in Fig. 2, and consisting of the signaling device proper 26 and an operating mechanism for the same arranged on the dashboard 23 and generally indicated by the numeral 27. The signaling device proper is housed in a casing 28, best shown in Figs. 11 and 12, showing a permanently secured or integral base for front plate 29, preferably turned in a forward direction when applied to the vehicle; a side wall 30 going around the rear portion of the device and encircling the lower rounded portion thereof, as at 30a, being permanently secured to the base plate 29 but extending only to the upper and lower terminations 31 and 32 so as to leave a free space, generally indicated by the numeral 33, in the outwardly turned portion of the device. An appropriate cover 34 fits to the right hand or rearwardly turned side of the housing 28, being in size and shape identical with the base plate 29 and being removably secured to the side wall 30, as by the use of lugs 35 on said side wall and screws engaging said lugs, or in any other suitable manner well known in the art. The lower portion 30a of the said wall has, integrally cast therewith, a hollow arm 36, which terminates in a bracket plate 37, by which the device may be secured upon the said wall of the automobile. Holes 38 are provided in the said wall 30a for communication between the inside of the housing and of the hollow arm 36. Both base plate 29, and the cover 34, also show the central openings 39 through which the rotatable shaft employed in my device and its associated parts may pass. The signaling arms proper will be rotatably housed in casing 28 and their outlines are indicated in an imaginary manner by the dot and dash lines 40, in Fig. 11.

Turning now to Figs. 4 to 8, for the details of the signaling arms and their operating mechanisms, a bushing 41 is permanently secured through the opening 39 in the base plate 29, as by the disk 42 integral therewith, and a longitudinal narrow slit 43 is also provided for the greater length of the bushing 41, as shown in Figs. 4 and 5.

A rotatable hub disk 44 (Figs. 4 to 6) is arranged around the bushing 41 at the left hand end thereof having an inner space 45 provided therein in which is housed a coiled flat spring 46, one end of which is secured into the rotatable hub disk 44 engaging the slot 47 thereof, while the other end is secured to the stationary bushing 41 engaging the inner left hand end of its slot 43, as at 48. The rotatable hub disk 44 also carries a pin 49 projecting through an appropriate segmental slot 50 (Fig. 11) in the base plate 29, while in the other direction said hub disk 45 has an integral sleeve segment 51 projecting therefrom.

The signaling arms proper 40 are arranged side by side along the stationary bushing 41 rotatable therearound and each having an upper plate like portion 52 and a lower hub portion 53 secured thereto or integral therewith. Each hub portion shows the countersunk space 55 therein, similar to the space 45 in the previous hub disk 44, and in each space 55 a flat spring 56 is coiled, one end of each being secured in a slot 57 in the hub 53 while the other end is caught in the elongated slot 43 in the stationary bushing 41. Washers 58 may be placed between the rotating parts just described.

A hollow shaft 59 is journaled in the bushing 41 having an arm 60 integral therewith, which is engaged by the pin 49 so that the hollow shaft 59 is forced to follow the rocking movement of the rotatable hub disk 44. A cord 61, preferably made of flexible but highly resisting material, like steel rope, is secured to each hub 53 of each arm 40, as at 62, passing through the respective hole 38 and along the inside of the hollow arm 36. Said cords pass through an appropriate opening of the side wall of the automobile and are then secured to operating elements within the operating portion 27 of my device, the latter being shown in a diagrammatic manner in Fig. 2, while the details thereof are illustrated in Figs. 9 and 10.

Said operating mechanism is housed in a partly open casing showing a base plate 63 and a cover plate 64, the two being secured together in a spaced apart manner, as by throughgoing bolts 65, and then the whole casing is secured on the outside of the dashboard 23, as at 66.

A peculiarly shaped cam 67 is provided for each signaling arm, said cams being rotatably arranged in a side by side manner on a central shaft 68, and the respective inner ends 69 of the operating cords 61 are yieldingly and removably secured to the respective cams 67, as by each engaging the inner end of a recess opening 70 in the respective cam, a portion of the outer surface of each cam, starting from said recess 70, being provided with a groove 71, adapted to receive the cord 61 when the cam is operated.

Each cam is continued in an arm 72 having an operating knob 73 at its inner end projecting into the inside of the automobile, and arranged by any appropriate means well known in the art in such a manner as to permit a limited rocking movement for said arms. The arms are gradually longer to permit the independent operation of the cams.

A catch or lock device 74 is arranged on a shaft 75, rotatably housed in the plates 63 and 64, said catch device 74 being permanently urged in an inward direction by a spring 76 set against a limited back wall 77 of the casing. The forward end of the catch device 74 is turned inwardly to provide a hook 78 which normally is pressed against the portion 79 of the outer surface of the respective cam 67.

The use and operation of my device is as follows: normally all the signaling arms will be hidden within the housing 28 through the action of the spiral springs 56 in their hubs, reinforced by the action of the spiral spring 46 in the rotating hub disk 44, since all the signaling arms are engaged by the upper edge of the sleeve extension 51 on the hub disk 44 and are pressed upwardly through the action of the spring 46. In this condition the signaling device will appear as shown in the perspective of Fig. 1 or as shown looking at it from the forward direction in Fig. 3. I, preferably, paint a colored border or ornament 80 around the housing at both the forward and rearward sides thereof, another differently colored ornament 81 along the center of each said side, said ornament 81 being in the form of an exclamation mark, and I preferably leave a space 82 between said two ornaments, in the preferred choice of my colors, the outer border 80 being blue, the intermediate space 82 white, and the inner exclamation mark 81 red, but, of course, any other color scheme may be used. I may also paint certain slogans on an appropriate portion on each of the exposed surfaces of the housing, like "Watch Us Go." The rear surface of the housing may also have a mirror 83 arranged thereon with an appropriate adjusting device, as and for the purpose known in the art.

In the embodiment shown in the drawings three individual signaling arms are employed, the one indicated in Figs. 13 and 14 being used for left hand turns, the one in Figs. 15 and 16 for stops and the one in Figs. 17 and 18 for right hand turns. It also will be understood that other combinations and other styles of markings may be used for similar and other signals in my device.

When it is desired to expose an arm and give a signal therewith, one of the operating arms 72 will be pulled down in a left hand direction till it reaches its extreme left hand position indicated by the dot and dash lines in Fig. 9, and marked by 72a for this specific arm. In such a position of said arm, the cam 67 associated therewith will also be turned in a clockwise direction and will take up the position 67a, indicated by the dot and dash lines. Its recess 70 will now be in the position 70a and it obviously will pull the inner end of the cord 61 to an appropriate extent in an inward and downward direction, which, of course, will project the respective arm in the signal device proper from its housing into a horizontal position, as shown in Fig. 2. The catch device 78 will, during the first part of this operation, ride upon the rising surface 85 of the cam 67 and will then snap into the opening 70 under the action of the spring 76 and will thereby lock and fix the respective cam 67 and arm 72 in their final position indicated by the dash and dot lines. Through these means the projected signaling arm will remain and be fixed in its exposed position and it is obvious that through these means the driver will give ample forewarning to those behind and even before him of the intended turn or stop and such warning or signal will remain exposed all the time while said turn or stop is being executed.

The return of the projected signal arm is executed by a partial or initial operation of any other arm 72 than the one being locked in its left hand position. After, namely, a second knob 73 marked 73' in Fig. 9, and its arm 72 marked 72' are pulled downwardly and to the left side to a moderate extent, the rising surface 85 of the cam associated with said second arm, will push the hook 78 out of engagement with any recess 70 in any of the cams, since said hook 78 is wide enough to engage all the three cams, and so the cam of the arm used for signaling will be released and the arm will snap back into its vertical hidden position under the double action of its own spiral spring and the spiral spring in the hub 44. To reduce the noise and wear, possibly resulting from the snapping back of said arms, a piece 90 of resilient material, like rubber, may be secured to the upper rear side of the housing against which the arms may strike. In case, by inadvertence or by mistake, all the three arms 72 are pulled down simultaneously into their extreme left position and there locked, an appropriate device like a small handle may be provided on the outer end of the rotating shaft 75 by which it and the catch device 74 keyed thereon may be rocked in an anti-clockwise right hand direction, as indicated by the arrow 91 in Fig. 9, and the cams so released.

In association with the signaling means described hereinbefore, I also incorporate in my device signaling and illuminating lights.

The illuminating lights are arranged at both ends of the rotatable shaft 59 passing through the center line of the lower portion of the signal housing and the hubs 53 of the arms (Figs. 8 and 5). Said shaft shows a throughgoing bore 100 into which is led through a hole 101 an electric conductor 102 which may be branched out towards the two ends of said bore 100, as at 103 and 104. Into each end of said hollow shaft 59 is screwed a lamp socket 105 of any usual construction, well known in the art, having an electric light bulb therein and terminating in a preferably red lens 106, which when the lights are used, will give a red warning light both in forward and rearward direction, while the upwardly turned portions of the housings 105 show openings 107 through which the light of the lamps therein will be thrown in an upward direction illuminating both sides of the signal casing. When any signal is used, the shaft 59 will rotate with said signal, any signal arm being adapted to rock the rotating disk hub 44 by its sleeve extension 51, and said disk hub 44 rocking the shaft 59 through the pin 49 and arm 60. This way the light thrown through the opening 107 will turn with the signal arms and will illuminate them when in their projecting signaling positions. The current for the use of these lights may originate from any appropriate source like the battery used in an automobile, and will enter the lamps through the insulated conductors 102, 103, and 104 and then through the exposed but insulated buttons 108 and return to the battery through the metal body of the vehicle, as is well known in the art.

The electrical circuit used for this purpose is illustrated in the diagram of Fig. 19 wherein 109 and 110 are the two poles of the source of current from which the current goes in one direction into the body of the vehicle, or is grounded as shown at 111, while in the other direction it may go through a switch 112 of any appropriate make and in proximity of the driver's seat and then is continued through an appropriate conductor 113 into the termination 102 which enters the hollow shaft 59 divides into the two conductors 103 and 104, and contacts with the two lamps in the casings 105, indicated in the diagram by the numerals 114 and 115. The current after passing through the lamps 114 and 115 is grounded as at 116 and 117. Switch 112 is normally open but at night time the operator will close it so that the various lamps will be steadily illuminated.

Aside of the illumination described, I also employ another signal lighting system in connection with my signal device, said system consisting of a single lamp employed in the rear of the automobile as at 118, preferably being of amber color and which will be lit only when any of my signals are being operated, and the purpose of the same is to call the attention of the driver behind the car in question to the fact that a certain new move is contemplated or commenced by the driver of the car equipped with my system. The current for this lamp is preferably branched off from the circuit of the main lighting system of my device, as indicated at 119 in Fig. 19, and then passes to a normally open switch 120, after which it is continued in the conductor 121 to the rear of the car and then through the amber signaling light 118, and is finally grounded, as at 122.

Switch 120 is associated with the signal operating device 27 and is best shown in Fig. 9.

As will be seen in said figure, particularly comparing it with the showing in Fig. 10, on the left hand side of the cam casing two conductor posts 123 and 124 are secured on insulating blocks 125 and 126. Conductor spring 127 is secured on the post 124 in an insulated manner while an electrically conductive strip of material 128 is secured to the post 123 and has a downhanging electrical conducting arm 129, pivoted in an extension 130 of said strip 128, so that the arm 129 is steadily electrically connected to the post 123. An insulating block 131 is pivoted as at 132 underneath the arm 129. When the signal operating arm 72 is pushed into its extreme left position 72a, it will press the insulating block 131 upwardly against the electro conductive arm 129 and then will press said arm against the spring conductor 127 as shown in Fig. 9. The conductor 121 of the diagram of Fig. 19 will be introduced into the switch 120 by securing the termination of the same to one of the posts, like to the post 123, and the current will leave the switch by another conductor 121a being secured to the other post 124, and when the switch is in the closed position, as shown in Fig. 9, the current will pass through the post 123, strip of material 128, arm 129, spring conductor 127 and will leave the switch through the post 124, when the arm 72 is in a locking position, while the pivoted arms 131 and 129 of the switch will drop backwardly and the connection between the spring 127 and the arm 129 will be broken when arm 72 is returned. It is obvious that in this manner a signal light 118 will show a preferably amber color every time my device is operated in the night time, while said light will be cut off as soon as the signalling arm is returned to its inactive hidden position.

It is understood that modifications may be made in the parts and combinations of my device and I hereby reserve my right to any and all such changes and modifications as are within the spirit of the invention and the scope of the appended claims.

What I claim as new, is:

1. In a signaling device for vehicles, a plurality of rotatable signal arms, normally hidden in a housing and carrying appropriate signs, means operable from the driver's seat to select and project any one of said arms from said housing into an exposed signaling position; means to lock the projected arm in its signaling position, means whereby the partial operation of any other signal arm will release the projected one from its locking means, and means to automatically return the projected signal arm into its hidden resting position when so released, said means to select and project an arm including a rotatable cam for each arm and connecting means between said cam and said arm, whereby the rotation of the cam will place the arm into an exposed signaling position.

2. In a signaling device for vehicles, a plurality of rotatable signal arms, normally hidden in a housing and carrying appropriate signs, means operable from the driver's seat to select and project any one of said arms from said housing into an exposed signaling position; means to lock the projected arm in its signaling position, means whereby the partial operation of any other signal arm will release the projected one from its locking means, and means to automatically return the projected signal arm into its hidden resting position when so released, said means to select and project an arm including a rotatable cam for each arm; and connecting means between said cam and said arm, whereby the rotation of the cam will place the arm into an exposed signaling position; said locking means engaging said cam at the end of its operation and the partial operation of any cam acting on said locking means and releasing all cams from the same.

3. In a signaling device for vehicles, a plurality of rotatable signal arms, normally hidden in a housing and carrying appropriate signs, means operable from the driver's seat to select and project any one of said arms from said housing into an exposed signaling position; means to lock the projected arm in its signaling position, means whereby the partial operation of any other signal arm will release the projected one from its locking means, and means to automatically return the projected signal arm into its hidden resting position when so released, said means to select and project an arm including a rotatable cam for each arm; and connecting means between said cam and said arm, whereby the rotation of the cam will place the arm into an exposed signaling position; said locking means engaging said cam at the end of its operation, the partial operation of any cam acting on said locking means and releasing all cams from the same, and said returning means including a spring associated with each signal arm.

4. In a signaling device for vehicles, a plurality of rotatable signal arms, normally hidden in a housing and carrying appropriate signs and having a common shaft, means operable from the driver's seat to select and project any one of said arms from said housing into an exposed signaling position; and means to normally illuminate the signaling housing when the signals are at rest, said means being arranged on the shaft of said arms and being adapted to turn with the operation of any arm so as to illuminate only the arm in use.

CHARLES KARA.